US 008595173B2

(12) United States Patent
Yu et al.

(10) Patent No.: US 8,595,173 B2
(45) Date of Patent: Nov. 26, 2013

(54) DASHBOARD EVALUATOR

(75) Inventors: Leo Chi-Lok Yu, Hong Kong (HK); Zhiyong Gong, Shanghai (CN)

(73) Assignee: Business Objects Software Limited (IE)

( * ) Notice: Subject to any disclaimer, the term of this patent is extended or adjusted under 35 U.S.C. 154(b) by 265 days.

(21) Appl. No.: 12/953,404

(22) Filed: Nov. 23, 2010

(65) Prior Publication Data

US 2012/0123989 A1    May 17, 2012

(30) Foreign Application Priority Data

Nov. 15, 2010    (CN) .......................... 2010 1 0543834

(51) Int. Cl.
*G06N 5/02* (2006.01)
*G06F 3/00* (2006.01)

(52) U.S. Cl.
USPC ............................................ 706/47; 715/762

(58) Field of Classification Search
USPC .............................. 706/47; 715/762; 345/619
See application file for complete search history.

(56) References Cited

U.S. PATENT DOCUMENTS

2009/0322782 A1* 12/2009 Kimchi et al. ................. 345/619
2012/0041990 A1*  2/2012 Kreindlina et al. ........... 707/805

* cited by examiner

*Primary Examiner* — Jeffrey A Gaffin
*Assistant Examiner* — Ola Olude Afolabi
(74) *Attorney, Agent, or Firm* — Horizon IP Pte. Ltd.

(57) ABSTRACT

A dashboard evaluator is disclosed. The dashboard evaluator evaluates a dashboard design for its effectiveness in providing the information. The dashboard evaluator determines a compliance score to indicate a level of compliance with dashboard design principles. The design principles may be tailored to a specific purpose and/or user.

15 Claims, 16 Drawing Sheets

DASHBOARD EVALUATOR

TECHNICAL FIELD

The present disclosure relates generally to intelligent tools. In particular, an intelligent tool includes an evaluator for a dashboard used for visualizing data.

BACKGROUND

Dashboard tools are business intelligence tools which are used to create dashboards for visualizing data based on defined metrics and key performance indicators (KPIs). A good dashboard design should effectively present aggregated views of data. The effectiveness of a dashboard design may depend on rules based on the user (e.g., user-centric), data visualization and dashboard design principles. These rules, however, may be complex and may vary depending on the application, making it difficult for dashboard designers to following them during development. This may often lead to long dashboard development time or ineffective dashboard designs.

It is therefore desirable to provide tools which improve dashboard designs.

SUMMARY

A method of designing a dashboard is disclosed. The method includes providing a dashboard design and providing a set of best practice rules related to dashboard design principles. A best practice rule of the set of best practice rules may include a weight value based on an importance of the best practice rule. The dashboard design may be evaluated based on the best practice rules to determine a compliance score to indicate a level of compliance with the best practice rules.

In another embodiment, a dashboard evaluation system is presented. The system includes a processor and a non-transitory memory device in communication with the processor. The memory device has computer readable program code tangibly embodied therein that is adapted to be executed by the processor to implement a method for evaluating a dashboard design. The memory device includes a knowledge base module containing a set of best practice rules related to dashboard design principles. A best practice rule of the set of best practice rules may include a weight value based on an importance of the best practice rule. The memory device also includes an evaluation engine. When the evaluation engine is invoked to evaluate a dashboard design, the evaluation engine receives the dashboard design and determines a compliance score to indicate a level of compliance with the set of best practice rules by the dashboard design.

In yet another embodiment, a computer usable medium is disclosed. A computer readable program code is tangibly embodied in the computer usable medium. The computer readable program is adapted to be executed by a processor to implement a method for evaluating a dashboard design. The computer usable medium includes a knowledge base containing a set of best practice rules related to dashboard design principles, wherein a best practice rule of the set of best practice rules includes a weight value based on an importance of the best practice rule. An evaluation engine is also included for evaluating the dashboard design to determine a compliance score to indicate a level of compliance with the best practice rules. The computer usable medium also includes an evaluation result module for displaying the level of compliance to the set of best practice rules by the dashboard design.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for displaying data is described herein. The display framework may be used, for example, to display business information to enhance the decision making process. In one implementation, the present framework can evaluate the effectiveness of dashboards used to visualize data. The framework may provide guidance to, for example, dashboard designers to improve the workflow related to designing dashboards.

Figure 1:
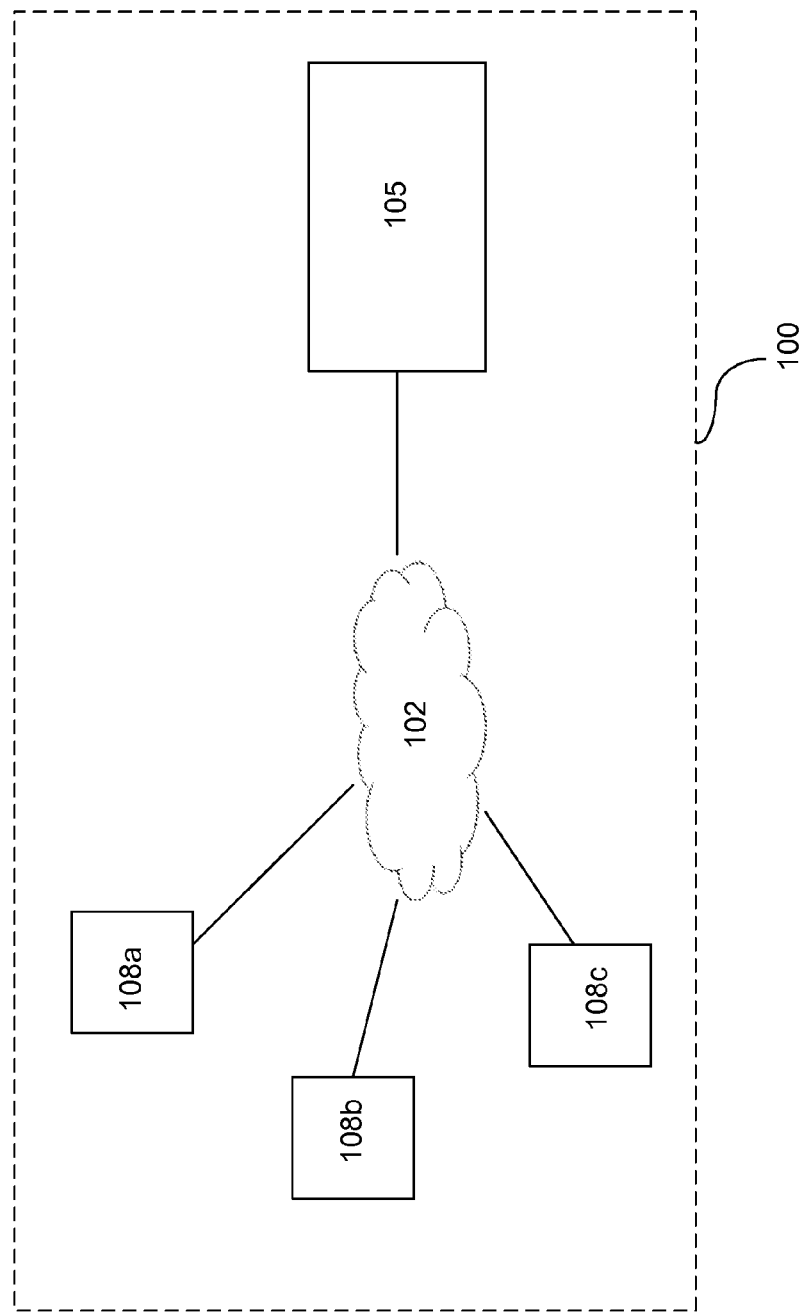
FIG. 1 shows an embodiment of an environment.

FIG. 1 shows a block diagram of an exemplary environment 100. The environment, for example, facilitates visualizing data. The environment may have a client/server architecture. For example, the environment may be a distributed client/server architecture. In one embodiment, the environment includes one or more clients 108a-c and a server 105 communicatively coupled via a communication network 102. Clients 108a-c may access the server 105 to store information and/or retrieve information maintained on the server. Furthermore, the server may facilitate communication between clients.

The communication network, for example, may be a local area network (LAN) which interconnects different devices, such as the clients and server. Other types of networks may also be useful. The devices may be coupled via the network by wireless and/or wired connections.

The server, in one embodiment, may be a computer which includes a memory and a processor. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

Although the environment is illustrated with one server, it is understood that more than one server, such as a server pool, as well as computers other than servers, may be employed.

The memory of the server may include any memory or database module. The memory may be volatile or non-volatile types of memories, such as magnetic media, optical media, random access memory (RAM), read-only memory (ROM), removable media, or any other suitable local or remote memory component.

A client may be a local or remote computing device with, for example, local memory and a processor. The memory may include fixed and/or removable storage media such as a magnetic computer disk, CD-ROM, or other suitable media. Various types of processing devices may serve as a client. For example, the client may be a PC, tablet PC, workstation, network computer, kiosk or personal data assistant (PDA). Other types of processing devices may also be used. The processing devices may include a memory and a processor. Input and output devices may be provided for the processing device. The input device may be, for example, a keypad, touch screen, mouse, or other device that can accept information from a user. For example, a client may receive requests from a user using the input device. The output device may be a display to convey information to a user. Other types of input and output devices may also be useful. The clients can receive, transmit, process and store any appropriate data associated with the environment 100.

Client/server (C/S) applications may be provided in the environment. Generally, C/S applications include front end and back end portions. The front end portions are stored locally on the clients while the back end portions are located in the server. Various types of C/S applications may be provided in the environment.

A client may include a user interface for a user to interface with the environment for various purposes. For example, the interface may be used to access various applications in the environment. The user interface may also serve other purposes. In one embodiment, the user interface comprises a graphical user interface (GUI). A GUI may provide an efficient and user-friendly manner of presenting information or communicating with the environment. For example, a GUI may include a task menu as well as one or more panes for displaying information. Other types of user interfaces, such as command line interface (CLI), may also be useful. The type of user interface may depend on the type of application running on the client. For example, the front end portion may include a GUI to enable a user to interact with the back end portion to access data stored in the server.

Although the environment is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as the email system. Any user may access the user's respective account from any client by performing an authentication or a login process, such as providing a user name and password.

Figure 2:
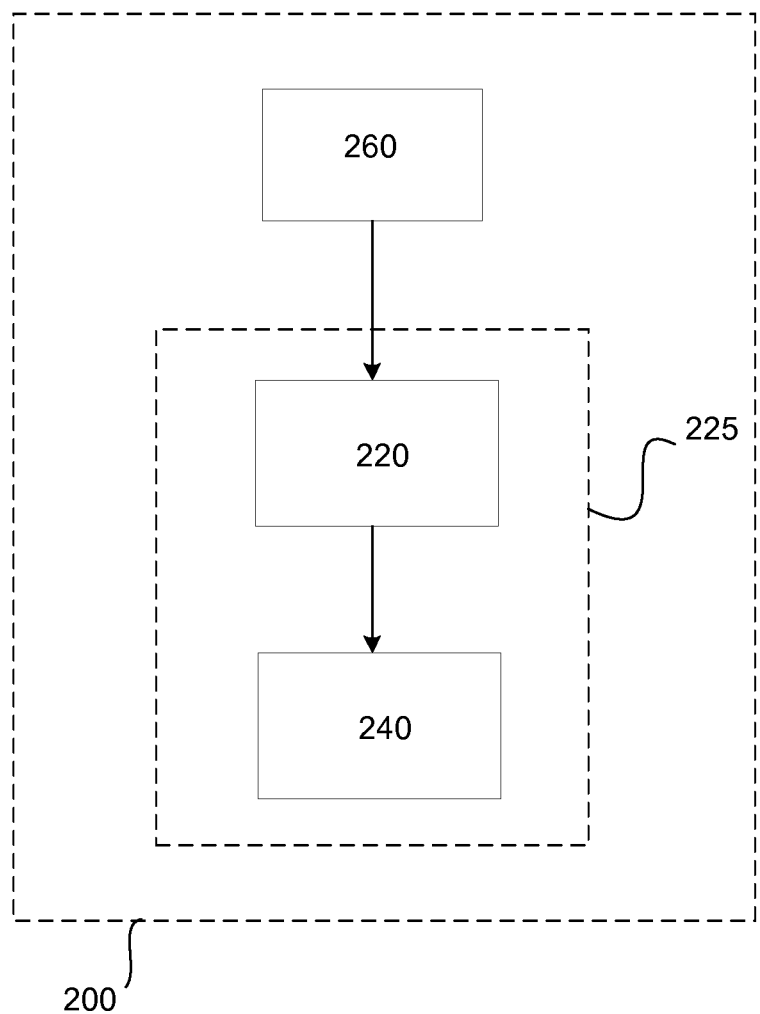
FIG. 2 shows an embodiment of a software environment.

FIG. 2 shows an embodiment of a software environment 200. As shown, the software environment may include a data source 260. The data source, for example, may be data files. Any type of data may be contained in the data files. The data files, for example, may be reports, spreadsheets, XML files, flat files, web service files or other types of files. The data files may be generated from one or more software applications, such as database or other types of software applications. For example, data may be personal data or business data, such as data of a company. Business data can include employee data, sales data, as well as other types of data related to a company. The software application may include various types of functions, such as report generation and functions related to data analytics. The software application may comprise a C/S architecture. For example, data, reports and other information may be stored in a server. In other embodiments, the software application may be locally installed in a client or a stand alone computer. In such cases, the data, reports and other information are locally stored.

In one embodiment, the software application comprises a business application. Various types of business applications may be used. The business application, for example, maintains data of a business and creates business reports relating to the data. Such business applications may include, for example, SAP Crystal Solutions, including Xcelsius, Crystal Reports, Web Intelligence from SAP AG. Other types of business applications or suites of business applications may also be useful.

A dashboard design application 220 is provided in the software environment. The dashboard design application is used to design or create dashboards. A dashboard may include different elements to present aggregated views of data using, for example, appropriate KPIs, metrics, trends, data visualizations and interactions.

For example, at the highest level, a dashboard includes a user interface (UI) or dashboard panel. Within the panel there may be one or more viewing zones which correspond to the second highest level. A viewing zone includes one or more visual components to facilitate data visualization. Providing other types of components or elements may also be useful. Depending on the design, a viewing region may include sub-viewing regions having different visual components. The dashboard may also be provided with different features or functions. For example, components or elements, such as drop down menus, sliders and command buttons for performing "what if" analyses and dynamic visualization of data may be provided to enable interactions by a user at runtime. It is believed that the use of dashboards enables quick understanding of the data to facilitate better and more efficient decision making.

In one embodiment, the dashboard design application is SAP® BusinessObjects™ Xcelsius® Enterprise. Other types of dashboard design applications may also be useful. For example, the dashboard design application may be SAP® Visual Composer.

Figure 3A:
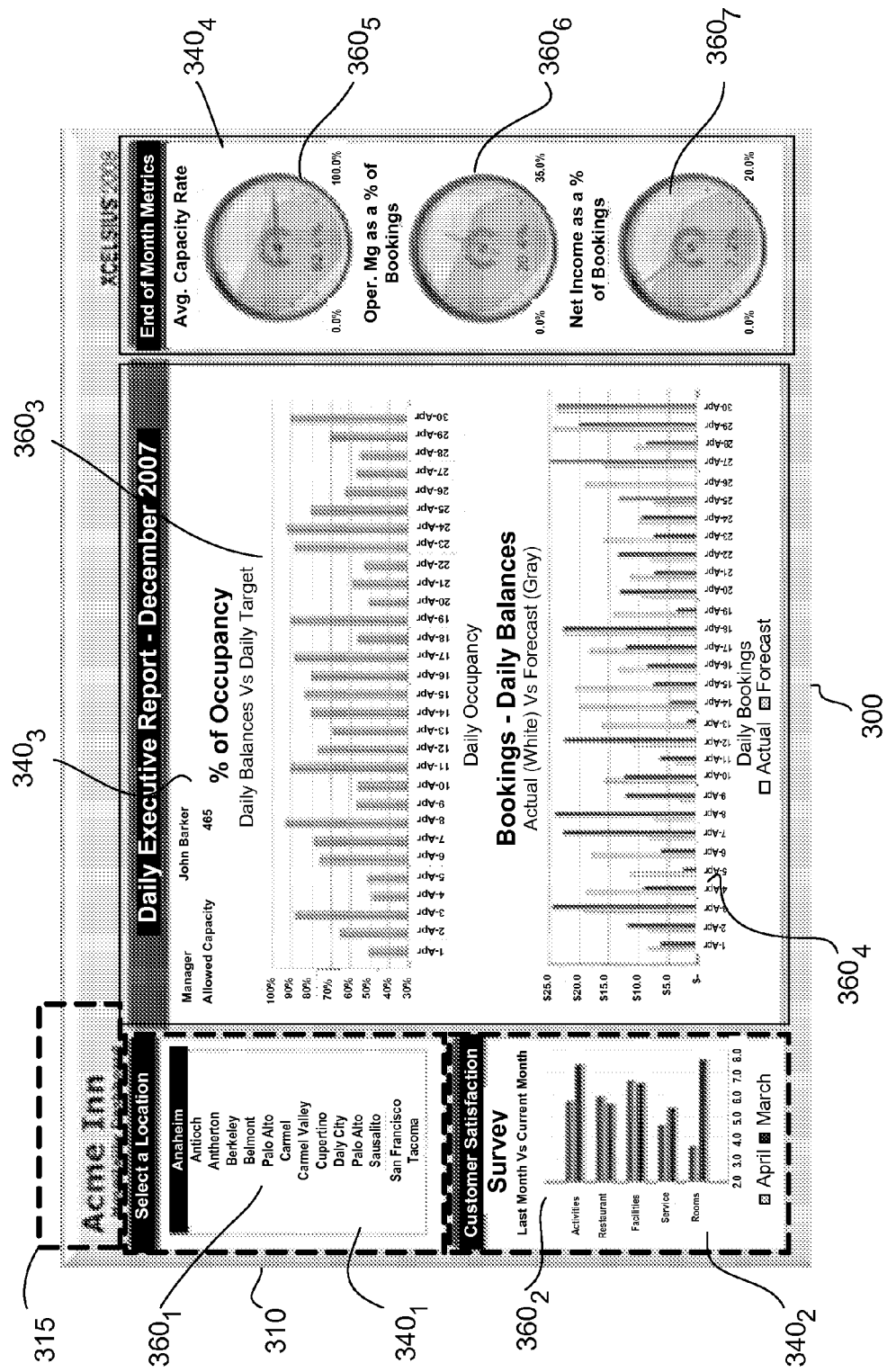
FIGS. 3a-b show exemplary embodiments of dashboards.

FIG. 3a shows an exemplary embodiment of a dashboard 300. As shown, the dashboard includes a dashboard UI or panel 310. The panel is a top level of the dashboard. A dashboard label 315 is provided to describe the dashboard. The dashboard label may be disposed at about an edge of the dashboard. For example, the dashboard label is disposed in an upper left corner of the dashboard. Disposing the dashboard label at other locations may also be useful.

Within the panel there may be one or more viewing zones 340. A viewing zone may also be provided with a viewing zone label. A viewing zone includes one or more visual components 360 or other types of components. Components, for example, include different types of charts, graphs, gauges, selectors, filters, maps and skins. The different components are used to visualize data or segments of data, such as by filtering.

Illustratively, the dashboard provides views of data for a chain of inns. In this context, KPIs, trends and important information, for example, relate to occupancy, customer satisfaction and revenues. The dashboard includes four viewing zones $340_{1-4}$. Providing the dashboard with other number of viewing zones may also be useful. The first viewing zone $340_1$ includes a filter component for displaying information from a region, such as a city. Providing other types of filters, such as time, may also be useful.

The second zone $340_2$ displays a chart component $360_2$. As shown, the chart component comprises an analytic grid or bar chart displaying information related to customer satisfaction. The third zone $340_3$ includes first and second chart components $360_{3-4}$. The chart components comprise analytic grids or bar charts which represent occupancy information and booking (e.g., dollar amount) information. The fourth zone $340_4$ includes first, second and third gauge components. The gauge components show average capacity rate and operating mg as a percentage of booking and net income as a percentage of booking. Other types of information or analytics may be displayed by the dashboard, depending on the application.

As described, the dashboard contains a single page. Providing dashboards having multiple pages may also be useful.

Figure 3B:
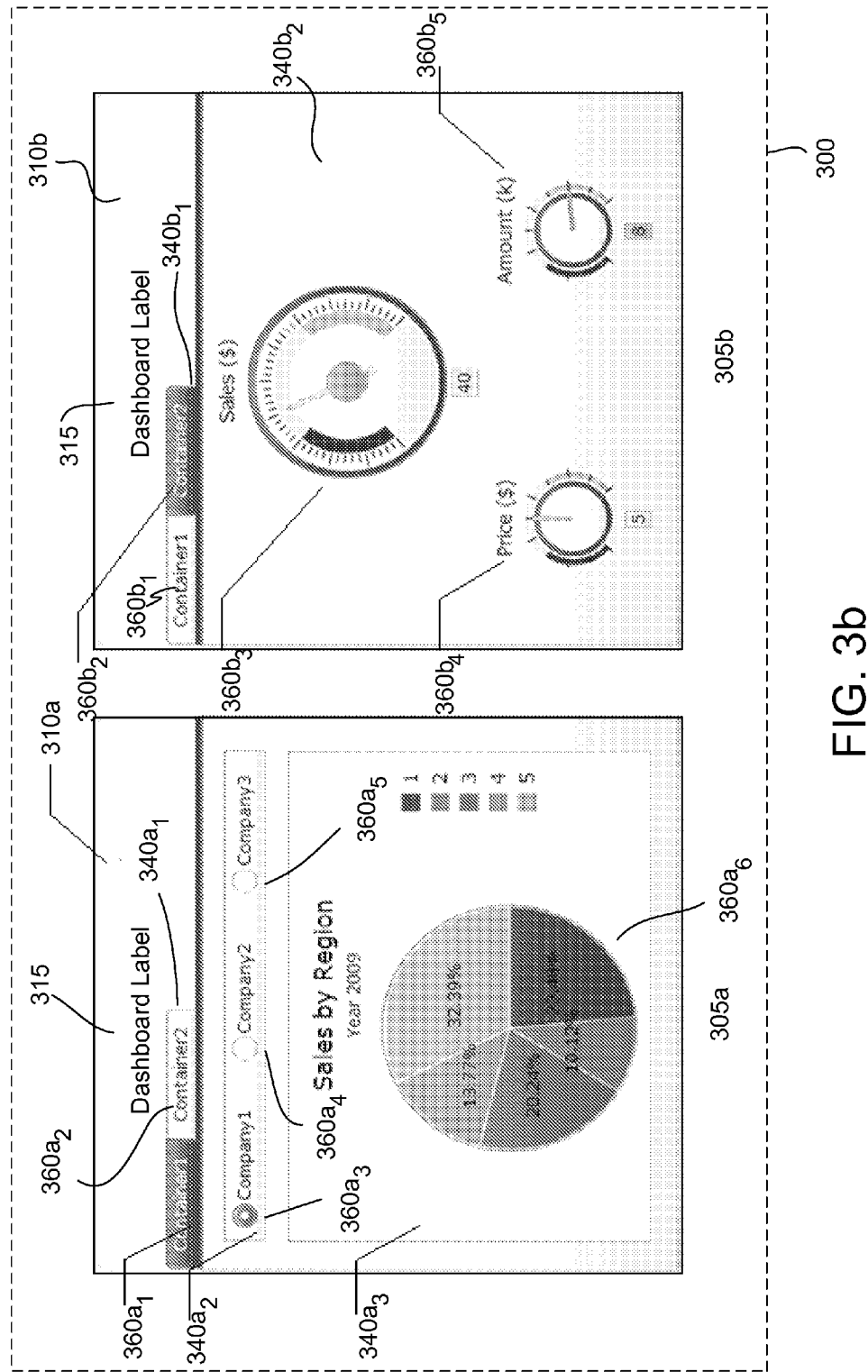

FIG. 3b shows another exemplary embodiment of a dashboard 300. As shown, the dashboard contains first and second pages 305a-b with dashboard label 315. The panel 310a is the top level of the first page. The first page includes first, second and third viewing regions $340a_{1-3}$. The first viewing region contains first and second selector components $360a_{1-2}$. The selector components, for example, comprise tab components for selecting the page of the dashboard for viewing. The second viewing region includes first, second and third filtering components $360a_{3-5}$. The filtering components, for example, are radio button components for selecting the desired subset of data to view. For example, the radio button components enable a user to view data of a desired company from a group of companies. The third viewing region includes a chart component $360a_6$. The chart component comprises a pie chart. Illustratively, the pie chart represents sales data by region.

As for the second page, it includes first and second viewing regions $340b_{1-2}$. The first viewing region, similar to that of the first page, contains first and second selector components $360b_{1-2}$. The selector components, for example, comprise tab components for selecting the desired page of the dashboard for viewing. The second viewing region includes a first gauge component $360b_3$ and first and second dial components $360b_{4-5}$. The gauge component shows sales while the dial components show price and amount.

A gauge or a dial component may be used to show, for example, a KPI vs. its target. The KPI value may be shown by a needle while the target may be represented by a color range. As shown, the color range includes 3 colors. The colors may be, from left to right, red, yellow and blue. The colors may be used to indicate the relative position of a particular KPI with respect to its target. For example, red indicates that the KPI is below target, yellow indicates that the KPI is close to target while blue indicates that the KPI is at or above target.

Using the selector and filtering components, a user may switch between pages of the dashboard as well as sales data and performance of the different companies.

An important aspect of a dashboard is to present information effectively to enable a user to quickly understand and to make decisions based on the information.

Referring back to FIG. 2, the software environment includes a dashboard evaluator 240. The dashboard evaluator, for example, may be integrated into the dashboard design application, as indicated by a dashed line 225. In other embodiments, the dashboard evaluator may be a separate application which interacts with the dashboard design application. Other configurations of dashboard design applications and dashboard evaluators may also be useful.

The dashboard evaluator evaluates different elements of the dashboard to determine the effectiveness of a dashboard. For example, when a dashboard is created, the dashboard evaluator can be initiated to evaluate the dashboard. The evaluator will perform an evaluation and present the results of the evaluation to the user. The results, for example, indicate a level of compliance with a set of given design principles. This may indicate the effectiveness of the dashboard design.

The software environment may include additional applications which interact with the data source and dashboard design and evaluation applications. For example, the applications may be used to generate reports and perform data analytics. Other types of tools or applications, such as Microsoft Office, Adobe and/or a web portal, may also be provided in the software environment.

Figure 4:
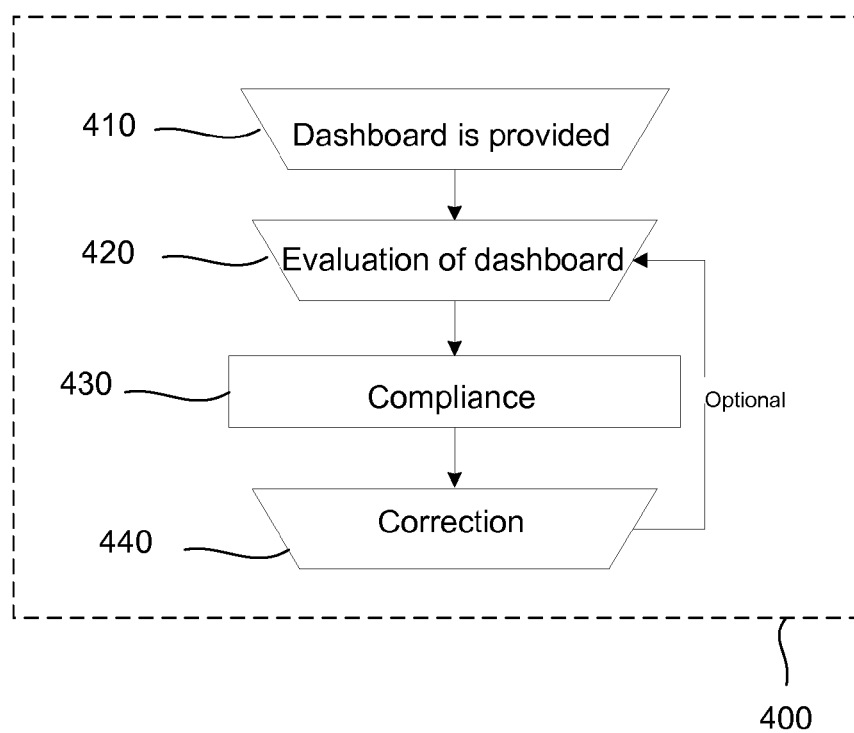
FIG. 4 shows an embodiment of a process for designing a dashboard.

FIG. 4 shows an embodiment of a process 400 for designing a dashboard. A rectangular block corresponds to a system activity while a trapezoidal block corresponds to a user activity. At step 410, a dashboard model is provided. The dashboard model is a data representation of the graphical dashboard. The dashboard may be, for example, designed by a user or a dashboard designer. In other embodiments, the dashboard may already exist in the software environment. At step 420, the evaluator or evaluator function is invoked to perform an evaluation on the dashboard model. The evaluator determines the effectiveness of a dashboard at 430. In one embodiment, the evaluator determines the effectiveness of a dashboard by determining the level of compliance to a predefined set of design principles. The level of compliance may be indicated by an evaluation score determined by the evaluator.

Based on the evaluation, the dashboard designer may make changes at step 440 to increase effectiveness of the dashboard. For example, the dashboard designer may make changes to the dashboard to increase compliance level to the design principles. The dashboard with changes may be reevaluated at step 420. The process may be repeated until a desired level of compliance is achieved.

Figure 5:
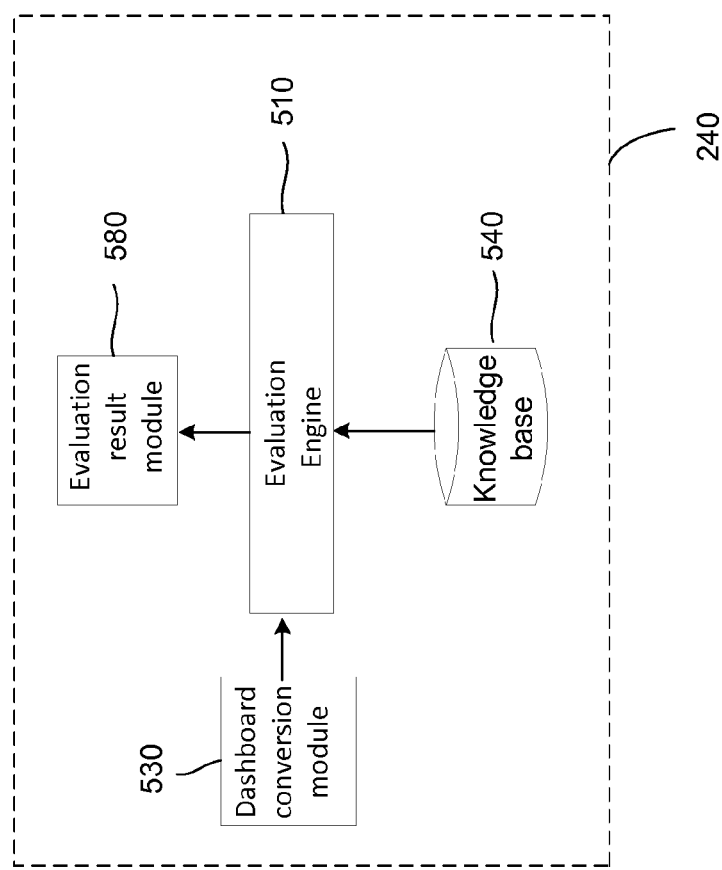
FIG. 5 shows a high level architecture of an embodiment of a dashboard evaluator.

FIG. 5 shows a high level architecture of a dashboard evaluator 240. In one embodiment, the dashboard evaluator comprises an evaluation engine 510, a dashboard conversion module 530, a knowledge base 540 and an evaluation result module 580. The knowledge base contains design principles related to dashboard designs. The design principles may be based on best practices, such as industry practices. Basing the design principles on other factors, such as company best practices or individual best practices, may also be useful. A plurality of best practice rules are contained in the knowledge base. The best practices may be divided into different categories. For example, the design principles may be divided into categories, such as color, layout, visualization, interaction and font. Best practice rules may be added to the knowledge base by a user. This enables the knowledge base to evolve as well as being customized for specific purposes and/or specific users.

The dashboard conversion module converts a graphical dashboard into a dashboard model for evaluation by the evaluation engine. In one embodiment, the dashboard model is a data structure of the dashboard elements corresponding to the dashboard. The data structure includes information related to the different categories for evaluation. The evaluation engine evaluates the dashboard model to determine the level of compliance by the dashboard to the design principles. The evaluation result module includes an evaluation result application. In one embodiment, the evaluation result application comprises an evaluation scoring application. For example, the evaluation scoring application provides a score which correlates to or indicates the level of compliance to the best practices or rules.

The rules of the knowledge base may be assigned weight values. For example, a weight value may be assigned to a rule based on its importance in the context of design principles. The weight assigned to a rule, for example, may be based on its importance vis-à-vis other rules. The more important the rule, the higher the weight value. The weight value may be from 1 to 10. The granularity of the weight value may be 0.1. Other weight value ranges and/or weight granularities may also be useful. The weight value may be determined by the user, based on the application or user preferences. In the case where a rule is added by a user, the user may also determine the weight value.

The evaluator may apply the applicable best practice rules to the input dashboard design. The evaluator determines a score of a best practice rule based on the evaluation process applied. Different evaluation processes may be applied to different rules. The score of a rule may be, for example, from 1 to 100. Providing other scoring ranges may also be useful. In one embodiment, a score of a rule may be multiplied by its weight value to determine its weighted score. For example, a rule having a weight value of 8 and an evaluated score of 80 will have a weighted score of 640.

The score of a rule may be used to indicate the level of compliance with that rule. In some embodiment, the weighted score of a rule may be incorporated in determining the level of compliance with that rule. Other schemes of evaluation for the level of compliance may also be useful.

In one embodiment, the scores of the different rules may be consolidated based on the weighting system to determine an overall score of the evaluation, which indicates the level of compliance to the design principles. For example, the consolidated score ($Score_C$) of applied rules 1 to n may be determined as follows:

$$Score_c = \frac{\text{Sum of weighted scores}}{\text{Sum of weights}}$$

As an illustration, three rules are applied to evaluate a dashboard design. The evaluated score and weight of each rule are as follows:

Rule$_1$→score$_1$=80, weight$_1$=8;
Rule$_2$→score$_2$=70, weight$_2$=5; and
Rule$_3$→score$_3$=85, weight$_3$=6.

The consolidated score of the three rules is equal to:

$$Score_c = \frac{(80 \times 8) + (70 \times 5) + (85 \times 6)}{(8 + 5 + 6)} = 79.5$$

In other embodiments, the consolidated score may be determined using other processes or techniques.

Figure 6:
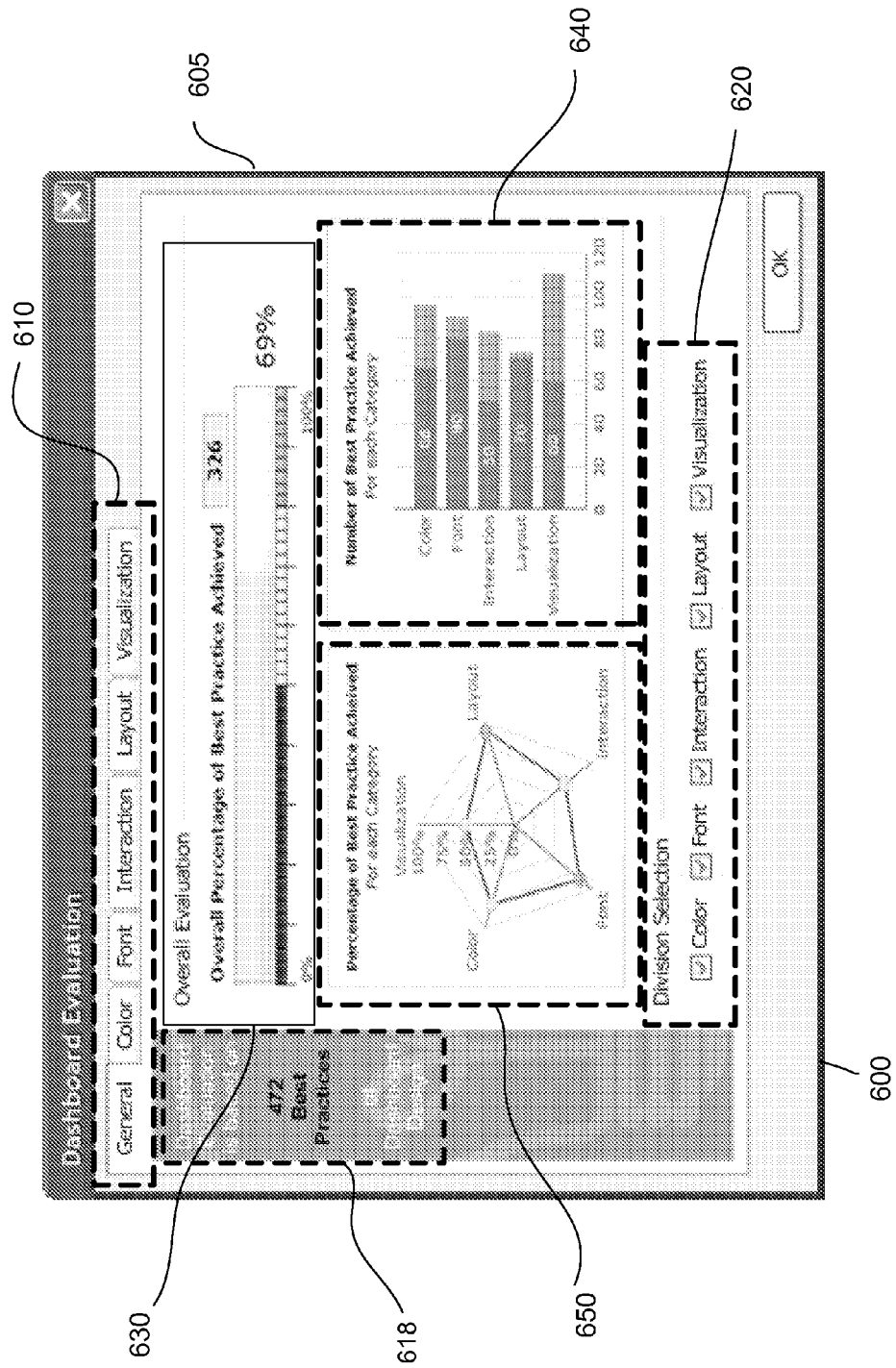
FIG. 6 shows an exemplary embodiment of an evaluation scoring application.

FIG. 6 shows an exemplary embodiment of an evaluation scoring application 600. The evaluation scoring application, for example, includes an evaluation interface 605. The evaluation interface includes a first tab portion 610. As shown, the tab portion is disposed in an upper portion of the evaluation interface. Locating the tab portion at other parts of the evaluation interface may also be useful. The tab portion includes a plurality of tabs for selecting the desired page of the evaluation interface to display. For example, a general page displays the overall evaluation results while other pages are provided for displaying evaluation results of different categories. In one embodiment, the different categories evaluated include color, font, interaction, layout and visualization. Evaluating other categories may also be useful.

A division selection region 620 is also provided in the evaluation interface. The division selection region includes check boxes corresponding to the different categories which are evaluated. The evaluator evaluates the dashboard in the category or categories selected in the division selected region. This allows a user to evaluate certain characteristics of the dashboard.

The evaluation interface includes a rules indicator 618. The rules indicator indicates the number of rules or best practice rules from the knowledge base which were used to perform the evaluation to determine the effectiveness of the dashboard. As shown in the exemplary embodiment, 472 rules were used for the evaluation of the dashboard. It is understood that other number of rules may be employed for the evaluation. It is also further understood that the knowledge base may contain additional rules which were not selected for the evaluation. As such, the evaluation is based on a sub-set of the rules stored in the knowledge base. In some cases, all the rules may be employed to perform the evaluation. The general page includes first, second and third evaluation regions 630, 640 and 650. The first evaluation region has a first chart indicating the overall percentage of compliance with the best practice rules. In one embodiment, the first chart comprises a ruler bar. The second evaluation region includes a second chart which provides a break down of the total number of best practice rules within each category and the number of rules complied with by the dashboard in each category. In one embodiment, the second chart comprises a bar chart. The third evaluation region has a third chart showing a break down of percentage of compliance with the best practice rules. As shown, the third chart comprises a concentric geometric shaped ring chart. In one embodiment, the third chart comprises a concentric pentagram shaped ring chart, in which each corner of the pentagram corresponds to one of the five evaluated categories. Providing other types of charts for the evaluation regions and/or other types of regions may also be useful.

In one embodiment, the conversion module performs a conversion process which extracts information from the graphical dashboard to form a data structure of its visual elements and properties to facilitate evaluation by the evaluation engine. The conversion module, in one embodiment, extracts information from the graphical dashboard or source definition file of the graphical dashboard to determine the hierarchical relationship between the different elements to create a tree representation. The number of hierarchical levels in the tree representation may depend on the number of evaluation levels desired. In one embodiment, the tree representation has three levels. Providing a tree representation with other number of levels may also be useful. Additionally, the conversion process also extracts attribute information related to the visual properties of the elements. Other types of information may also be extracted from the source definition file.

Figure 7:
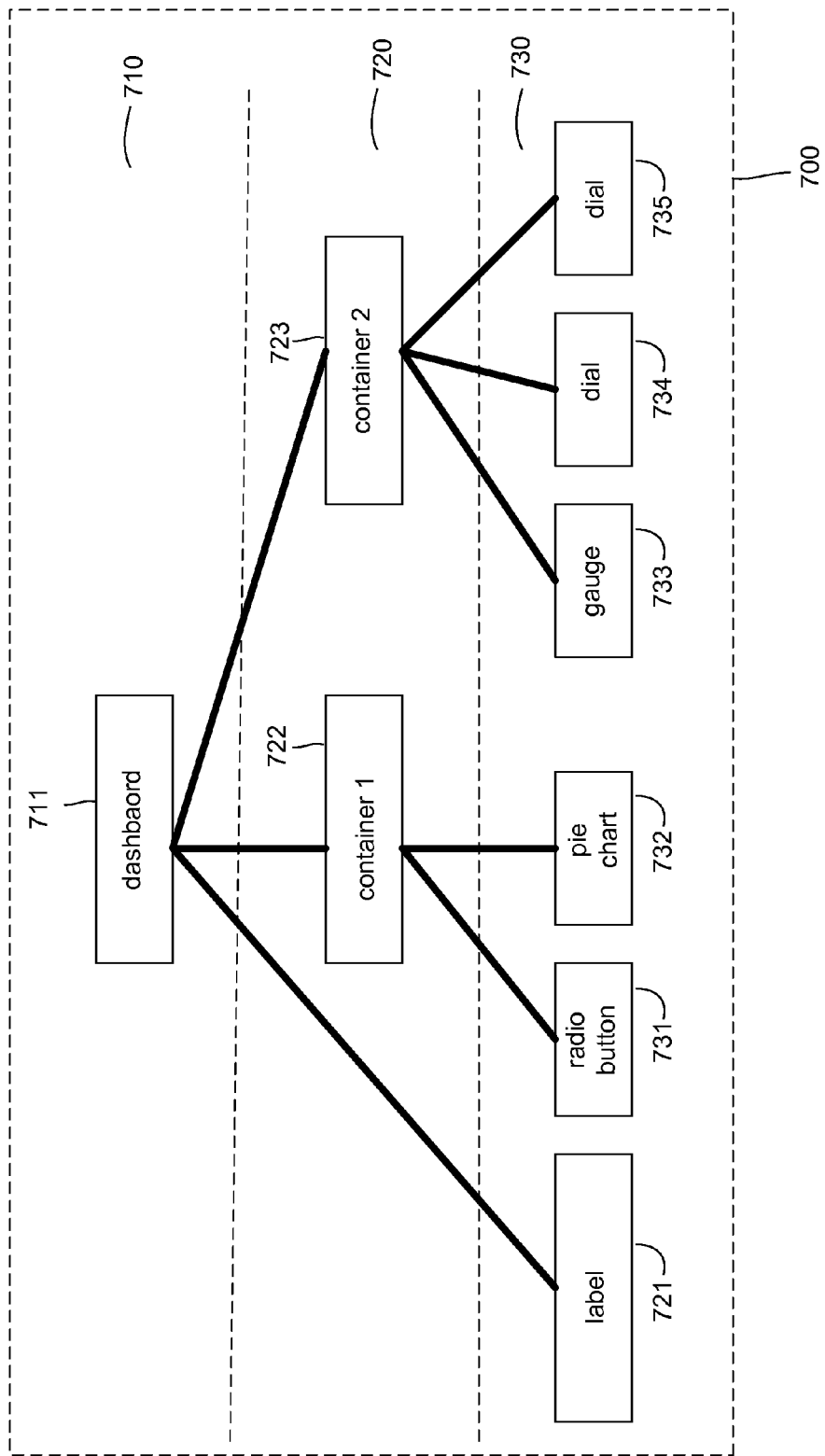
FIG. 7 shows an exemplary embodiment of a tree representation of a graphical dashboard.

FIG. 7 shows an exemplary embodiment of a tree representation 700 of a graphical dashboard. As shown, the tree representation includes first, second and third hierarchical levels 710, 720 and 730 having nodes which correspond to elements of the dashboard. For example, the tree representation includes top, intermediate and bottom levels. Clear blocks represent container type elements and shaded blocks represent component type elements. Container type elements are elements which have one or more component type elements while component type elements may be visual elements or other types of components.

At the top level is a root node of the dashboard. The root node corresponds to the highest element of the dashboard. For example, the root node is the canvas and serves as an entry point to the dashboard. The canvas, for example, is the highest level container type element and may contain different sub-nodes and leaf nodes. The intermediate hierarchical level includes sub-nodes. The sub-nodes correspond to the container type elements of the dashboard. The bottom level includes leaf nodes. The leaf nodes may correspond to component elements, such as those used for visualizing data or filtering segments of data for visualization. For example, a leaf node may include a label, chart, graph, gauge, selector, filter, map or skin. Other types of component elements may also be included in a leaf node.

The tree representation, for example, corresponds to the dashboard 300 of FIG. 3b. As shown, the root node 711 includes a leaf node 721 and first and second sub-nodes 722 and 723. The leaf node is the label of the dashboard (e.g., Dashboard Label). The first sub-node corresponds to the first page or container 1 of the dashboard and the second sub-node corresponds to container 2. Container 1 includes first and second leaf nodes 731 and 732. The first leaf node includes radio buttons for selecting data of company 1, company 2 or company 3. The second leaf node shows a pie chart of data by region for the selected company. Container 2 includes first, second and third leaf nodes 733, 734 and 735.

Figure 8:
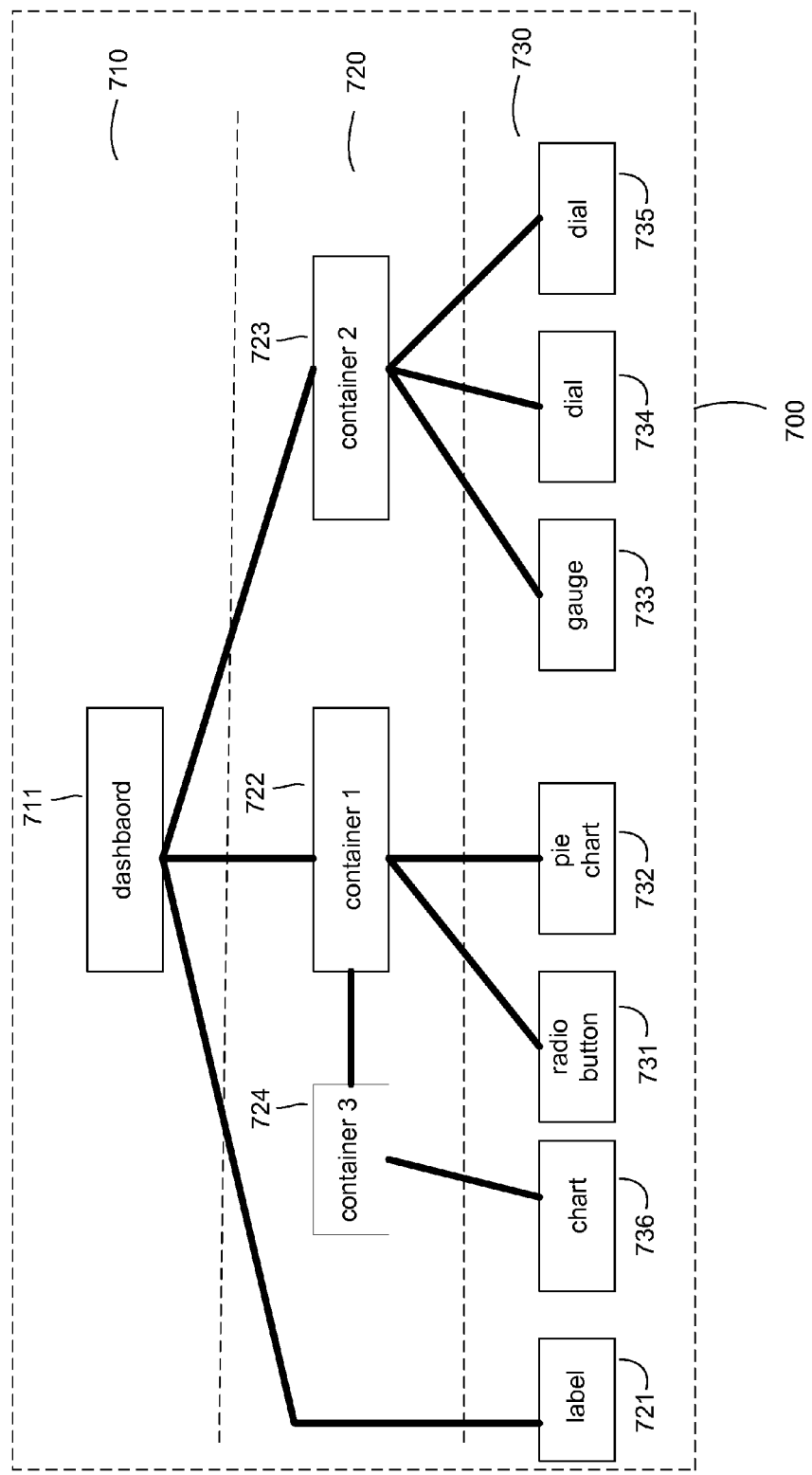
FIG. 8 shows another exemplary embodiment of a tree representation of a graphical dashboard.

Although the intermediate level containers are shown to only include components, it is understood that they may also include containers which include components. For example, as shown in FIG. 8, the first sub-node may include a sub-node 724 (container 3) having a leaf node 736 which is a chart. Providing other configurations of the data structure to represent the graphical dashboard may also be useful.

Additionally, each node also includes information about the visual properties of the element. A property list may include, for example, title, subtitle, drill down, drill up, interaction, dynamic visibility, enable data animation, element size, element location, entry effect, chart background, plot area fill and border, title area fill and border, legend, series color, text font, text type, text size, scrollbar, and scrollbar color or a combination thereof. It is understood that the property list is not exhaustive. For example, additional or other type of attributes may also be useful or included. The list of properties or attributes may depend on the extent of the evaluation of the dashboard. For example, the list of properties defines the scope of the evaluation of the dashboard.

In one embodiment, properties may be divided into two groups. For example, the properties may be divided into common properties and class properties. Common properties are properties which are common to all elements while class properties are only common to those elements in the same class. For example, class properties are only common to the same component type. Dividing element properties into other number of groups may also be useful.

Table 1 shows an exemplary embodiment of properties for a label.

TABLE 1

| | |
|---|---|
| Common | Label.Position = {x:20;y:6}<br>Label.Text = Dashboard Sample<br>Label.Font<br>{forSize:24;fontFamily:verdana;fontColor:0x000000}<br>Label.hasScrollBar = false<br>Label.EnableHTMLFormation = false<br>Label.EntryEffect = None<br>Label.Background = None<br>Label.Border = None |
| Class | Label.WrapText = None |

Figure 9:
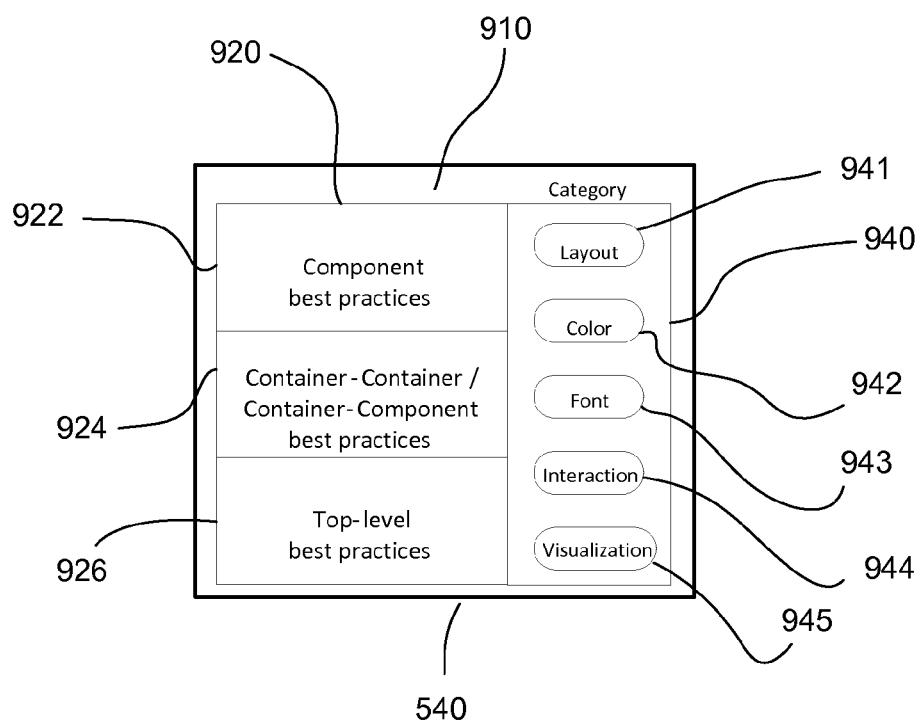
FIG. 9 shows an embodiment of a knowledge base.

FIG. 9 shows an embodiment of a knowledge base 540. The knowledge base contains best practice rules 910. The best practice rules may be based on industry standards. In other embodiments, the best practice rules may be based on industry standards and company standards. In yet other embodiments, the best practice rules may be based on industry standards, company standards, type of application and user or a combination thereof. It is understood that the evaluator may include a plurality of knowledge bases for specific applications or purposes. Additionally, the knowledge base may be dynamic. For example, the knowledge base may be changed to evolve over time to accommodate current needs. In other embodiments, the knowledge base may be imparted with artificial intelligence to add or delete rules based on use.

In one embodiment, the best practice rules are segmented into sets 920. A set of rules is used for an evaluation level. In one embodiment, the best practice rules are segmented into three sets for three levels of evaluation. For example, the rules are segmented for top level evaluation 926, intermediate level evaluation 924 and bottom level evaluation 922. The best practice rules for the top level evaluation apply to the overall dashboard design. The best practice rules for the intermediate level evaluation apply to containers. Evaluating containers includes evaluating containers having containers or containers having components. The best practice rules for the bottom level evaluation apply to components. Table 2 contains examples of best practice rules related to the different levels. It is understood that the list of rules contained in the table 2 is an exemplary list and is not meant to be exhaustive. For example, the knowledge base may contain other or additional rules.

TABLE 2

| Level | Rules |
|---|---|
| Leaf node level | Legend should exist in the chart to indicate what different colors represent.<br>The color of any two series in one chart should not be too similar. |

TABLE 2-continued

| Level | Rules |
| --- | --- |
| | Highlight the color of key value with respect to its background and neighboring elements. |
| Sub-node level | Avoid overlap between components, between the component and its containers and between container and another container. |
| | Data which is important or needs to be emphasized, should be highlighted (with outstanding color, special color or some effect). |
| | Too many colors and the "wrong" colors are worse than too few colors. |
| | Contrast colors: the color of graphs compared to the background colors. |
| | Do not mix a number of different font types/sizes within the same container group. |
| Root node level | Dashboard should be designed to fit into a single viewable area (e.g., no scroll bar). |
| | Dashboard should use a set of color schemes to keep consistency and make values easy to read and easy on the eyes. |

The best practice rules may include different categories of best practice rules 940 related to dashboard design principles. For example, the knowledge base may include five different categories 941-945, such as layout, color, font, interaction and visualization. Providing additional or other categories of rules may also be useful. A rule, for example, may be associated with its general and class characteristics. For example, a rule may be associated with the evaluation level and category, such as with the top level and the layout category. A weight value may also be associated with the rule. For example, a rule may be illustrated as follows:

Rule 1:
weight=10;
level=top level; and
category=layout.

Figure 10:
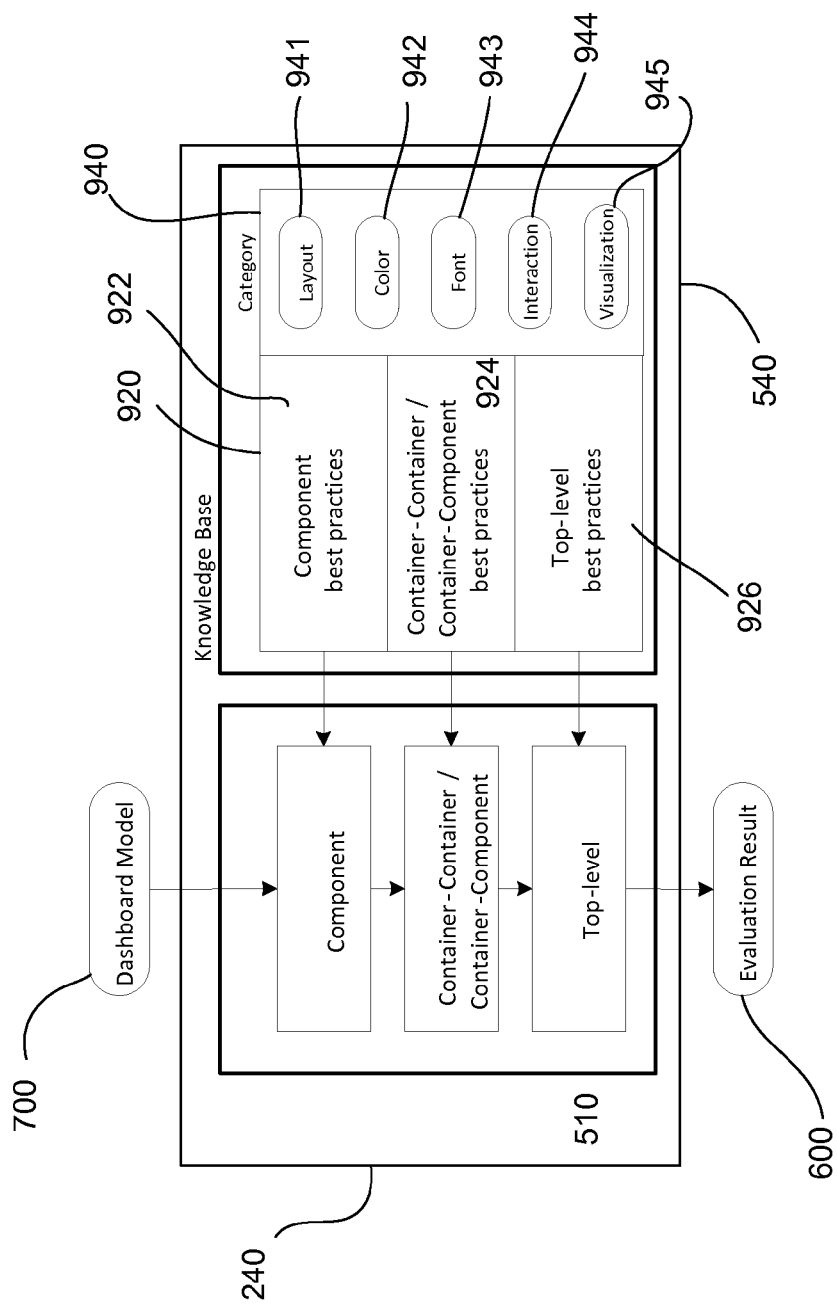
FIG. 10 shows an embodiment of an evaluator.

FIG. 10 shows an embodiment of an evaluator 240. The evaluator includes a knowledge base 540. The knowledge base, in one embodiment, is similar to that described in FIG. 9. For example, the knowledge base comprises best practice rules segmented into sets 922, 924 and 926 for first, second and third level evaluations. The best practice rules may include different categories 940, such as layout, color, font, interaction and visualization.

The evaluator also includes an evaluation engine 510. The evaluation engine evaluates a dashboard model 700. The dashboard model, for example, is similar to that described in FIGS. 7-8. Other types of dashboard models may also be useful. The evaluation engine, in one embodiment, comprises first, second, and third evaluation modules 922, 924 and 926. In one embodiment, the evaluator performs a bottom-up evaluation. For example, the first evaluation module evaluates leaf node elements of a dashboard module 700, the second evaluation module evaluates the sub-node elements of the dashboard and the third evaluation module evaluates the root node element dashboard. In other embodiments, the evaluation engine may have other number of evaluation modules or other evaluation schemes.

The result of the evaluation may be compiled in an evaluation scoring application 600. The evaluation scoring application may be similar to that described in FIG. 6. For example, the evaluation scoring application may inform the user of the level of compliance with the best practice rules. Providing the results of the evaluation in other types of evaluation application may also be useful.

In other embodiments, the evaluator may include a suggestion module. The suggestion module, for example, may be part of the evaluation engine or evaluation result application. Providing a separate suggestion module may also be useful. The suggestion module provides suggestions, for example, to the user to improve the compliance level of a dashboard. The suggestions may be provided at the completion of the evaluation of the dashboard. Providing the suggestions when the non-compliance of a rule or set of rules is determined by the evaluator may also be useful. For example, the suggestions may be provided in real time as the evaluation is in process.

The suggestions, for example, may be in the form of queries to the user requesting whether the suggestion should be applied to the dashboard design. In yet other embodiments, the evaluator may automatically make changes to the dashboard design to improve compliance of the rules. The changes may be displayed. The user may be provided with an option to the user to accept or reject the changes.

In some embodiments, the evaluator may include a modification module. The modification module may be part of the suggestion module. Alternatively, the modification module may be integrated into other existing modules or as a separate module. The modification module, in one embodiment, tracks accepted and rejected changes or suggestions by the user. The modification module may include artificial intelligence or rules to modify the knowledge base according to the tracked information. The modification module may provide a summary report of changes to the knowledge base to the user. The user may be provided with an opportunity to override any changes made.

In yet other embodiments, the modification module may further include the function or ability to modify a dashboard design based on the tracked information. A summary report may be provided to the user for review, giving the user an opportunity to override any changes made.

As discussed, the modification module may make changes based on existing patterns of a user or users as well as on the application. Additional information may be provided, such as purpose and/or user may be provided to further enhance the intelligence of the modification module. Other types of information may also be provided to enhance the intelligence of the modification module.

Figure 11:
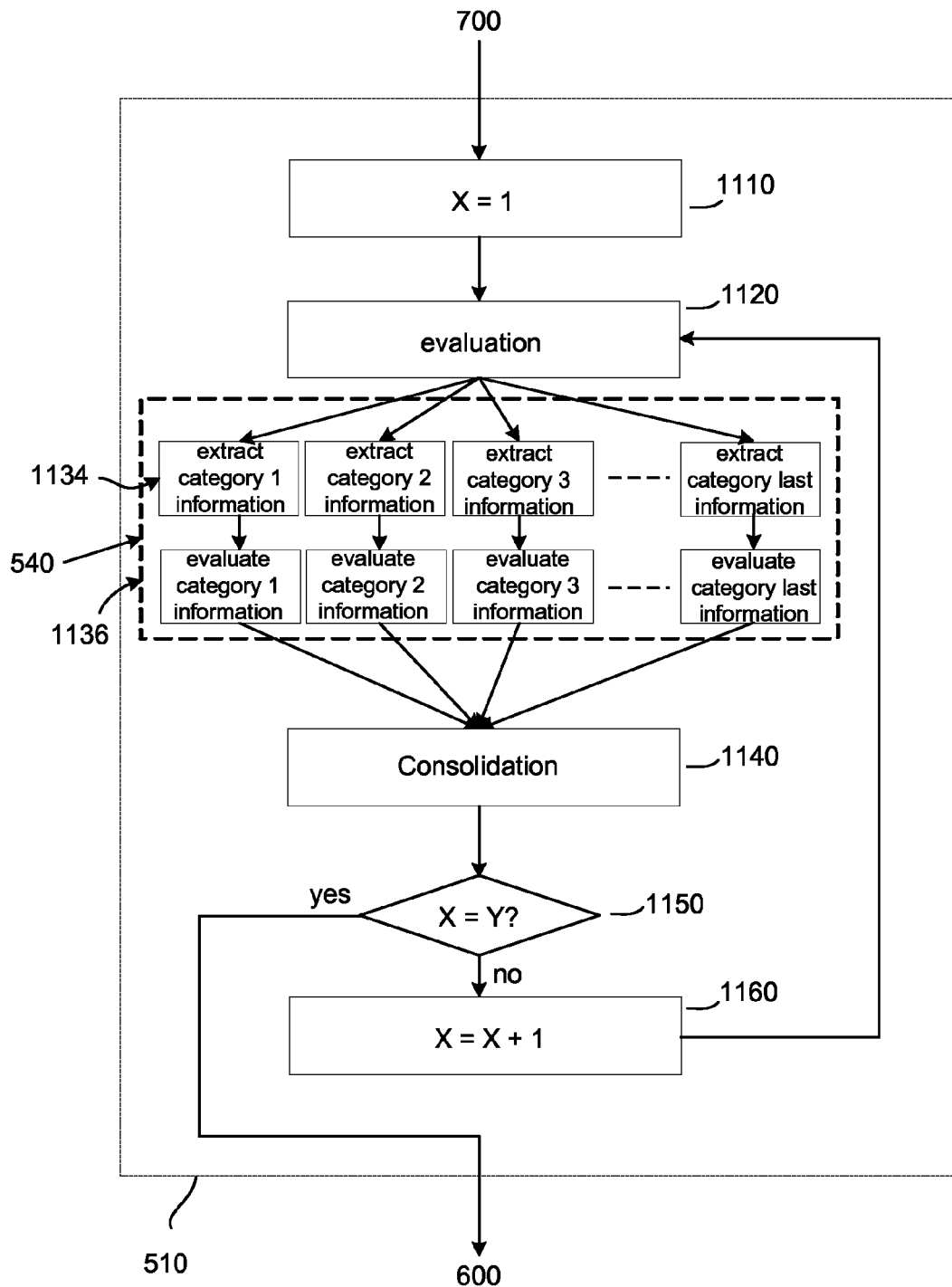
FIG. 11 shows an embodiment of an evaluation process.

FIG. 11 shows an embodiment of an evaluation process. The process, for example, may be performed by the evaluator 240. The evaluator receives a dashboard model 700 for evaluation. The dashboard model may comprise a tree data structure with nodes representing elements of the dashboard. The tree data structure may be similar to that described in FIG. 7. The tree data structure, in one embodiment, comprises first, second and third hierarchical levels. For example, the tree data structure includes a root node level, a sub-node level and leaf node level. In one embodiment, the evaluation process evaluates the tree structure using a bottom-up approach. Other evaluation approaches may also be useful.

In one embodiment, at step 1110, the evaluator may initialize a counter. The counter represents the evaluation level to be performed. For example, the counter is initialized to a value of 1, indicating the first evaluation level is to be performed. At step 1120, the evaluator commences the evaluation process. In one embodiment, the evaluator evaluates the bottom or leaf node level. The evaluation includes extracting information of the leaf nodes related to each category at step 1134. For example, layout, font, color, interaction and visualization information or attributes are extracted from the leaf nodes. At step 1136, the categories of extracted information are evaluated based on best practice rules from the knowledge base 540. For example, the categories are evaluated for compliance with best practice rules related to the leaf node level. The evaluation results for the leaf node level are consolidated at step 1140.

In one embodiment, the evaluator evaluates the nodes of a level at a time. For example, the evaluator may evaluate the bottom level one leaf node at a time. The information related to a leaf node is extracted and evaluated before going on to the next node. Once all nodes of a level are evaluated, the next level is evaluated. The evaluator, for example, applies all applicable or eligible rules for the node under evaluation and calculates the score for each rule. For example, in the case of a leaf node, all rules related to leaf nodes are filtered from the knowledge base and applied to the evaluation. In some cases, segments of the applicable rules may be extracted for evaluation, based on selection by the user. For example, if the user selects layout rules, only layout rules are extracted for evaluation. The scores are then consolidated for the respective node. A node level counter may be provided to ensure that all nodes within a level are evaluated before going on to, for example, the next higher level.

At step 1150, the evaluation process determines if there are any more levels to evaluate. For example, the process compares the counter to see if it is equal to y, where y is the last level. In this case, the process determines if the counter is equal to 3. If not, the counter is incremented at step 1160 and returns to step 1120 to evaluate the next higher node level. For example, the evaluator evaluates the sub-node level.

The evaluation process from steps 1120-1160 is repeated until all levels are evaluated. For example, the process terminates when the counter is equal to the highest level (e.g., y=3). The evaluation results may be provided in an evaluation scoring application 600. The evaluation score application may be similar to that described in FIG. 6. Other types of evaluation result applications may also be useful.

As described, the evaluator evaluates the dashboard for compliance with best practice rules contained in the knowledge base.

Figure 12:
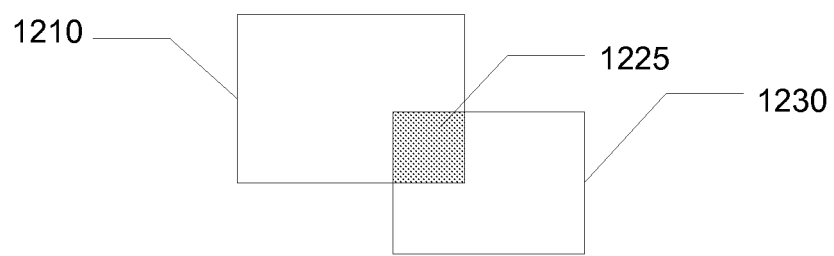
FIG. 12 shows an example of a scoring for a best practice rule in the layout category.

An example for evaluating a best practice rule in the layout category is illustrated in FIG. 12. In one embodiment, the best practice rule in the layout category relates to the overlap between components. For example, it is desirable to have no overlap between components. As shown, rectangles 1210 and 1230 represent areas of two different components in the dashboard. The two rectangles overlap in an overlap region 1225. The evaluator calculates a score by determining the overlap region vis-à-vis the non-overlap area. For example, the overlap score may be calculated as follows:

$$score_{overlap} = \left(1 - \frac{size_{overlap} * 2}{size_{component1} + size_{component2}}\right) * 100$$

Based on the above, the maximum overlap score is 100. When two components have no overlap, the score will be 100, which indicates the highest level of compliance with the overlap best practice rule. As the overlap area increases, the overlap score will decrease, indicating a lower level of compliance with the overlap best practice rule. This overlap rule can be applied to layout evaluations for different levels. Alternatively, different layout rules may be provided for different levels. A weight value may be associated with the score, depending on, for example, the importance of the rule.

A best practice rule in the color category may be related to contrast ratio of two colors. The contrast ratio C of two colors may be calculated by the following:

$$C = \frac{L1 + 0.05}{L2 + 0.05}$$

L1 is the relative luminance of the lighter of the two colors and L2 is the relative luminance of the darker of the two colors. Luminance of a color may be calculated by the following:

$$L=0.2126*R+0.7152*G+0.0722*B$$

The variables R, G and B are defined as:
if RsRGB<=0.03928 then R=RsRGB/12.92, else R=((RsRGB+0.055)/1.055)^2.4
if GsRGB<=0.03928 then G=GsRGB/12.92, else G=((GsRGB+0.055)/1.055)^2.4
if BsRGB<=0.03928 then B=BsRGB/12.92, else B=((BsRGB+0.055)/1.055)^2.4

The variables RsRGB, GsRGB, and BsRGB are defined as:
RsRGB=R8bit/255
GsRGB=G8bit/255
BsRGB=B8bit/255

The color variable 8bit indicates that the value of the color component is from 0-255 using 8 bits. For example, R8bit corresponds to the red color component from 0-255, G8bit corresponds to the green color component and B8bit corresponds to the blue color component. In other embodiments, the color variable may be represented by any other number of bits, including, for example, 1, 2, 3, 4, 10 or 16. In yet other embodiments, color models other than RGB, such as other additive (e.g., RGBA) or subtractive (e.g., CMYK) color models may also be employed.

Based on the above, the contrast ratio ranges from 1-21. A higher contrast ratio indicates greater readability while a lower contrast ratio indicates harder readability. For example, the contrast ratio of two colors should be greater than 5. Using other minimum contrast ratios for two colors may also be useful. A weight value may be associated with the score (contrast ratio), depending on, for example, the importance of the rule.

Figure 13:
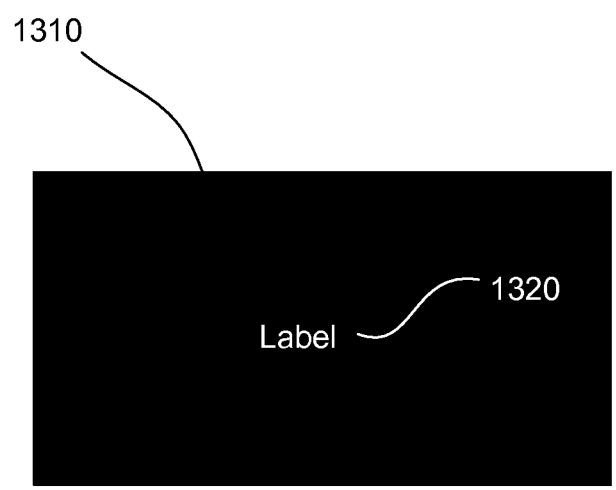
FIG. 13 shows an example of a scoring for a best practice rule in the color category.

FIG. 13 illustrates an example of evaluating a best practice rule in the color category. As shown, a white text label 1320 is provided in a black background 1310. The contrast ratio can be determined as described above. The color ratio C for white on a dark color, for example, is about 13, indicating readability. On the other hand the color ratio C for black on a dark color may be about 2, indicating low readability.

Figure 14:
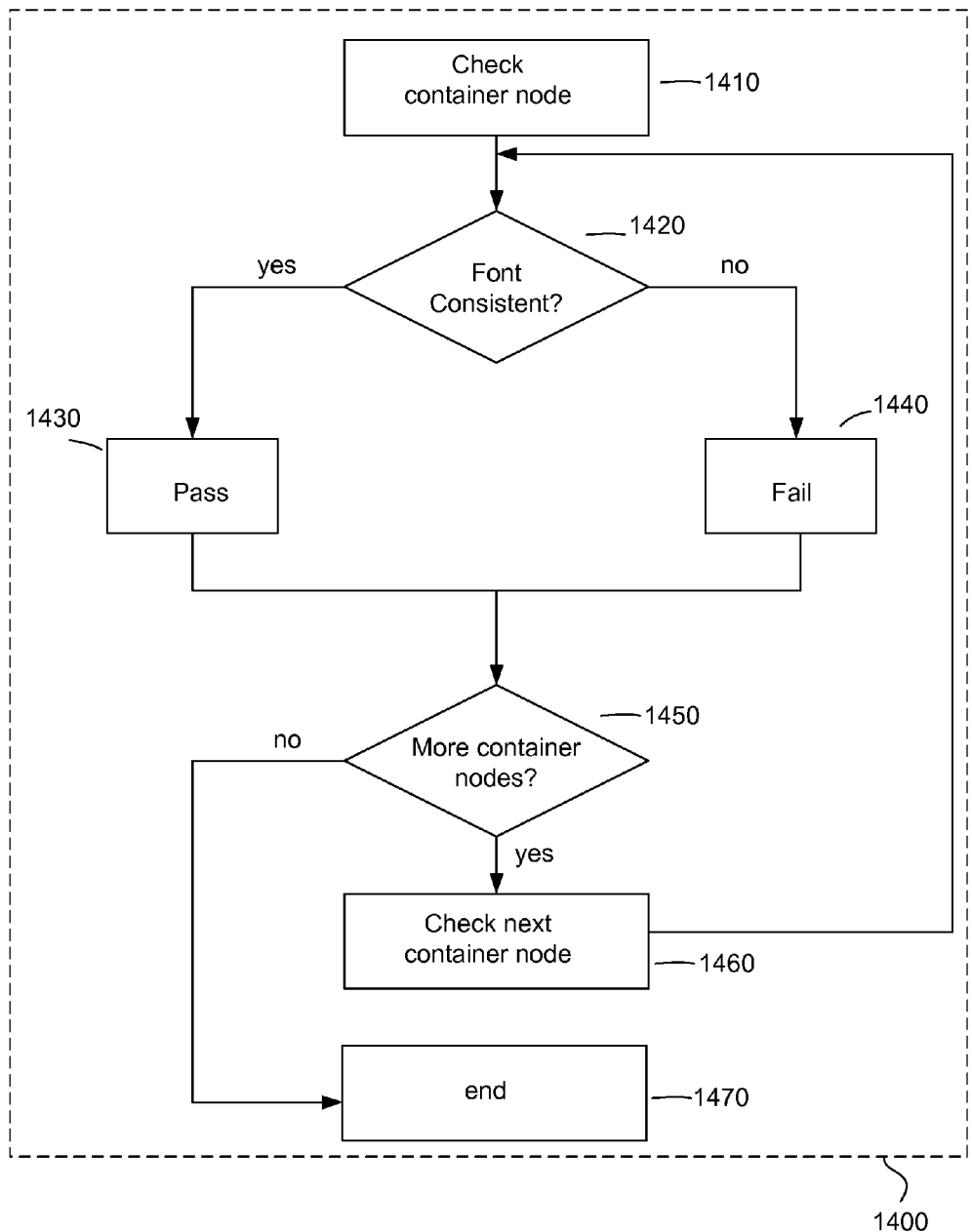
FIG. 14 illustrates an example of a process for evaluating a best practice rule in the font category.

FIG. 14 illustrates an example of a process 1400 for evaluating a best practice rule in the font category. A best practice rule in the font category may be related to mixing of fonts. In one embodiment, the fonts within a container should be consistent. For example, the font size and font type within a container should be the same. In other embodiments, the font type within the container should be the same. In yet other embodiments, the font size within the container should be the same. Providing other types of consistency checks may also be useful.

At step 1410, a container node in the tree representation, such as that described in FIGS. 7-8 may be checked. At step 1420, the evaluator determines if the fonts of the elements, such as components, in the container are consistent. For example, components within the same container, such as a container group, will be checked for font consistency. The evaluator returns a failure notice at step 1440 if the fonts within the container are inconsistent or a pass notice at step 1430 if the fonts within the container are consistent. At step 1450, the evaluator determines if there are more container nodes to be evaluated. If there are, the evaluator proceeds to 1460 to check the next container node. The process returns to step 1420 to check for font consistency within the next container. The process from step 1460 repeats until all container nodes have been checked. When all containers have been checked, the evaluator terminates the font consistency check. A consistency score may be provided based on the level of consistency. A weight value may be associated with the consistency score, depending on, for example, the importance of the rule. After all container nodes have been checked, the process terminates at 1470.

Figure 15:
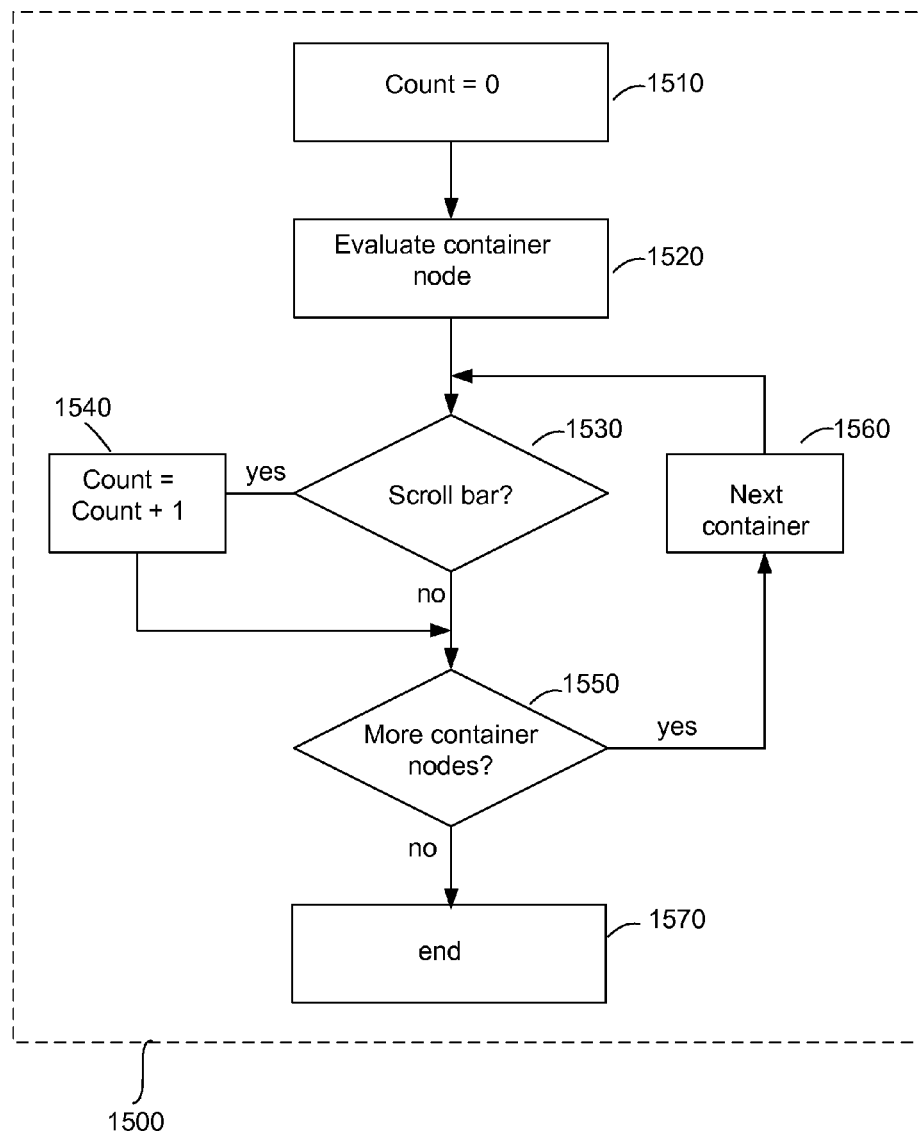
FIG. 15 illustrates an example of a process for evaluating a best practice rule in the interaction category.

FIG. 15 illustrates an example of a process 1500 for evaluating a best practice rule in the interaction category. A best practice rule in the interaction category may be related to scroll bars. In one embodiment, it is desirable to not have any scroll bars or the least amount of scroll bars. For example, at the root level, it is desirable to have no scroll bars while the least amount of scroll bars at the sub-node level.

The evaluator, in one embodiment, counts the number of scroll bars in the dashboard. At step 1510, the count is initialized to zero. A container node in the tree representation, such as that described in FIGS. 7-8 may be evaluated at step 1520. At step 1530, the evaluator determines if the container has a scroll bar. If the container does not have a scroll bar, the evaluator proceeds to step 1550. On the other hand, if the container has a scroll bar, the count is incremented by 1 at step 1540 and proceeds to step 1550. The scroll bar can be checked by, for example, examining the scroll bar flag indicating the presence or absence of a scroll bar.

At step 1550, the evaluator determines if there are more container nodes to evaluate. If there are, the evaluator proceeds to step 1560 to evaluate the next container. The next container is evaluated to determine if it contains a scroll bar at step 1530, as already described. The process from step 1560 is repeated until all container nodes have been evaluated. After all container nodes have been evaluated, the process terminates at step 1570.

The count is then further analyzed to determine compliance with the best practice rule. For example, the count is analyzed as follows:

$$evaluation_{noscrollbar} = \frac{count_{withscrollbar}}{count_{ofcomponents}}$$

As shown, the evaluation value (i.e., $evaluation_{noscrollbar}$) is equal to the count (i.e., $count_{withscrollbar}$) divided by the number of components (i.e., $count_{ofcomponents}$) in the dashboard. A weight value may be associated with the score, depending on, for example, the importance of the rule.

In one embodiment, the evaluation of a rule may have a threshold score which indicates whether a rule has passed or failed the evaluation. A rule may be indicated as passed if the score is equal to or above the threshold while a score below the threshold indicates a failure. The threshold score, for example, maybe 70. Other threshold scores may also be useful. Furthermore, it is understood that different rules may have different threshold scores.

In other embodiments, the consolidated score of all the rules may be taken into account whether a dashboard passes or fails the evaluation. For example, an overall compliance threshold value may be provided. A dashboard is indicated as being compliant if the score is equal to or above the overall compliance threshold while a score below the threshold indicates a failure. Additionally, the evaluation result of each rule may also be provided to indicate which rules passed and which rules failed as well as by how much. This provides useful information as to where and how to change the dashboard to improve the level of compliance.

The evaluator may be embodied as an application. For example, the evaluator may be embodied as a software application. The application may be integrated into an existing software application, such as a dashboard design application, as an add-on or plug-in to an existing application, or as a separate application. The existing software application may be a suite of software applications. The source code of the evaluator system may be compiled to create an executable code. The codes of the evaluator, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of designing a dashboard comprising:
providing a dashboard design having a multi-level tree structure;
providing a set of best practice rules contained in a knowledge base module, the set of best practice rules is related to dashboard design principles, wherein a best practice rule of the set of best practice rules includes a weight value based on an importance of the best practice rule; and
evaluating the dashboard design based on the best practice rules to determine a compliance score to indicate a level of compliance with the best practice rules, wherein the dashboard design is evaluated with an evaluation engine.

2. The method of claim 1 wherein the set of best practice rules is divided into a plurality of categories for dashboard evaluation.

3. The method of claim 2 wherein a user may select one or more of the plurality of categories of best practice rules for dashboard evaluation.

4. The method of claim 2 wherein the plurality of categories comprise layout, color, font, interaction, and visualization or a combination thereof.

5. The method of claim 1 wherein the set of best practice rules can be modified to provide a dynamic set of best practice rules.

6. The method of claim 1 wherein the best practice rules may be selected for evaluation based on a specified purpose or a specified user.

7. The method of claim 1 wherein the tree structure comprises three levels, wherein a top level comprises a dashboard level, an intermediate level comprises a container level and a bottom level comprises a component level.

8. The method of claim 1 wherein the evaluating of the dashboard design comprises evaluating the tree structure using a bottom-up approach.

9. The method of claim 1 comprises querying a user to accept or reject one or more suggestions to change the dashboard design.

10. A dashboard evaluation system for evaluating a dashboard design comprising:
   a processor; and
   a non-transitory memory device in communication with the processor and having a computer readable program code tangibly embodied therein, the computer readable program code adapted to be executed by the processor to implement a method for evaluating a dashboard design having a multi-level tree structure, comprising
      a knowledge base module containing a set of best practice rules related to dashboard design principles, wherein a best practice rule of the set of best practice rules includes a weight value based on an importance of the best practice rule; and
      an evaluation engine, wherein when the evaluation engine is invoked to evaluate a dashboard design, the evaluation engine receives the dashboard design and determines a compliance score to indicate a level of compliance according to the set of best practice rules by the dashboard design.

11. The dashboard evaluation system of claim 10 wherein the memory device further comprises a suggestion module for suggesting one or more modifications to improve the level of compliance according to the set of best practice rules.

12. The dashboard evaluation system of claim 10 wherein the memory device further comprises a conversion module for converting a graphical dashboard design into a dashboard model for evaluation by the evaluation engine.

13. A non-transitory computer usable medium having a computer readable program code tangibly embodied therein, the computer readable program code adapted to be executed by a processor to implement a method for evaluating a dashboard design having a multi-level tree structure, comprising:
   a knowledge base containing a set of best practice rules related to dashboard design principles, wherein a best practice rule of the set of best practice rules includes a weight value based on an importance of the best practice rule;
   an evaluation engine for evaluating the dashboard design to determine a compliance score to indicate a level of compliance with the best practice rules; and
   an evaluation result module for displaying the level of compliance to the set of best practice rules by the dashboard design.

14. The non-transitory computer usable medium of claim 13 wherein the computer readable program code is further adapted to implement a dashboard design application.

15. The non-transitory computer usable medium of claim 13 comprises a conversion module adapted to convert a graphical dashboard design into a dashboard model for evaluation by the evaluation engine.

* * * * *